(12) United States Patent
Itamura

(10) Patent No.: US 9,136,057 B2
(45) Date of Patent: Sep. 15, 2015

(54) CERAMIC ELECTRONIC COMPONENT, METHOD OF MANUFACTURING THE SAME, AND COLLECTIVE COMPONENT

(71) Applicant: MURATA MANUFACTURING CO., LTD., Nagaokakyo-Shi (JP)

(72) Inventor: Hiroto Itamura, Echizen (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 80 days.

(21) Appl. No.: 14/044,383

(22) Filed: Oct. 2, 2013

(65) Prior Publication Data

US 2014/0029160 A1 Jan. 30, 2014

Related U.S. Application Data

(62) Division of application No. 12/892,994, filed on Sep. 29, 2010, now Pat. No. 8,570,709.

(30) Foreign Application Priority Data

Oct. 29, 2009 (JP) .................................. 2009-248544

(51) Int. Cl.
*H01G 4/30* (2006.01)
*H01G 4/12* (2006.01)
*H01G 4/232* (2006.01)

(52) U.S. Cl.
CPC ................. *H01G 4/12* (2013.01); *H01G 4/232* (2013.01); *H01G 4/30* (2013.01); *Y10T 29/435* (2015.01); *Y10T 29/49002* (2015.01)

(58) Field of Classification Search
None
See application file for complete search history.

(56) References Cited

U.S. PATENT DOCUMENTS

| | | | |
|---|---|---|---|
| 3,603,850 A | 9/1971 | Kirschner | |
| 4,661,884 A | 4/1987 | Seaman | |
| 5,572,779 A * | 11/1996 | Adelman et al. | ............. 29/25.42 |
| 6,310,757 B1 | 10/2001 | Tuzuki et al. | |
| 6,381,118 B1 | 4/2002 | Yokoyama et al. | |
| 6,771,485 B2 | 8/2004 | Yokoyama et al. | |
| 7,054,136 B2 | 5/2006 | Ritter et al. | |
| 7,808,770 B2 | 10/2010 | Itamura et al. | |
| 7,863,662 B2 | 1/2011 | Sato et al. | |
| 2009/0284897 A1 | 11/2009 | Itamura | |

FOREIGN PATENT DOCUMENTS

| | | |
|---|---|---|
| CN | 101582329 A | 11/2009 |
| JP | 06-087085 A | 3/1994 |
| JP | 09-260187 A | 10/1997 |
| JP | 2003-273272 A | 9/2003 |
| JP | 2005-064446 A | 3/2005 |
| JP | 2005-079427 A | 3/2005 |
| JP | 2005-086131 A | 3/2005 |
| JP | 2006-216622 A | 8/2006 |
| JP | 2006-339337 A | 12/2006 |
| JP | 2007-173627 A | 7/2007 |
| JP | 2009-302509 A | 12/2009 |

* cited by examiner

*Primary Examiner* — Dion R Ferguson
(74) *Attorney, Agent, or Firm* — Arent Fox LLP

(57) ABSTRACT

A collective component has a first region that intersects with a conductive film for external terminal electrodes in a break line in which break leading holes are arranged and a second region that does not intersect with the conductive film for external terminal electrodes in the break line. The plurality of break leading holes includes at least one extending break leading hole located so as to extend over the first region and the second region.

20 Claims, 17 Drawing Sheets

PRIOR ART

CERAMIC ELECTRONIC COMPONENT, METHOD OF MANUFACTURING THE SAME, AND COLLECTIVE COMPONENT

This is a division of application Ser. No. 12/892,994, filed Sep. 29, 2010, the entire content of which is incorporated herein by reference.

BACKGROUND OF THE INVENTION

1. Field of the Invention

The invention relates to a ceramic electronic component, a method of manufacturing the same, and a collective component and, more particularly, to a ceramic electronic component in which an external conductor, such as an external terminal electrode, is formed on a principal surface and which is obtained by breaking a collective component along a predetermined break line, a method of manufacturing the same, and a collective component from which a plurality of ceramic electronic components may be obtained by dividing the collective component.

2. Description of the Related Art

A large number of monolithic ceramic electronic components, typically, monolithic ceramic capacitors, are used in electronic apparatuses, such as cellular phones and personal computers. Generally, the monolithic ceramic electronic component includes a rectangular parallelepiped ceramic element assembly and a pair of external terminal electrodes formed on an outer surface of the ceramic element assembly. The external terminal electrodes are mostly formed in such a manner that a conductive paste is applied to end portions of the ceramic element assembly by an immersion method and is baked. In this way, each external terminal electrode is formed to extend over five surfaces in total with one end surface of the ceramic element assembly as a center.

In recent years, there has been an increase in demand for electronic components for specialized applications, and the like, in which the shape and arrangement of the external terminal electrodes of the ceramic electronic component have been progressively diversified with a diversification of the configurations in which electronic components are mounted. For example, Japanese Unexamined Patent Application Publication No. 2006-216622 and Japanese Unexamined Patent Application Publication No. 2006-339337 suggest a type of electric component in which external terminal electrodes are formed on one surface or two opposite surfaces of the ceramic element assembly.

When the external terminal electrodes are formed on one surface or two opposite surfaces of the ceramic element assembly, it is possible to form the external terminal electrodes by methods other than the immersion method. For example, a method may be employed that a conductive paste film for external terminal electrodes is printed on a principal surface of a collective component that constitutes a plurality of ceramic element assemblies for a plurality of ceramic electronic components and is baked, and then the collective component is divided to obtain the ceramic element assemblies for individual ceramic electronic components, which is, for example, described in Japanese Unexamined Patent Application Publication No. 9-260187 (particularly, at paragraph [0003]).

If a cutter, such as a dicer, is used to divide the collective component, there is a possibility that a crack or a chip may occur in the ceramic element assembly of each ceramic electronic component because the collective component to be divided is formed of sintered hard ceramics. To solve the above problem, Japanese Unexamined Patent Application Publication No. 9-260187 suggests that an unfired collective component is press-cut by a plate-like cutting blade. However, there is a problem in this method since the raw chips tend to stick one another after cutting.

Another method could be the break method that is often used in manufacturing a ceramic multilayer board, or the like. In the break method, a break groove is formed in an unfired collective component, and, after firing, a collective component is divided along the break grooves. There is no problem such as that occurs when a dicer or a plate-like cutting blade is used, as described above. In addition, it is excellent in production efficiency because a plating process or a measurement process may be performed in a state of a collective component.

Various break methods have been suggested. Among others, the break method described in Japanese Unexamined Patent Application Publication No. 2003-273272 is attractive. According to a technique described in Japanese Unexamined Patent Application Publication No. 2003-273272, by forming discontinuous linear break grooves, it is possible to prevent the occurrence of an undesirable crack in a collective component in handling the collective component for additional processes.

On the other hand, it has been suggested to bury a ceramic electronic component inside the multilayer wiring board in recent years, in order to miniaturize the multilayer wiring boards. For example, Japanese Unexamined Patent Application Publication No. 2005-064446 describes a method of manufacturing a laminating module. The method includes processes in which, when a ceramic electronic component is buried inside a board, the ceramic electronic component is accommodated in a core board so that an external terminal electrode formed on a principal surface of the ceramic electronic component is, for example, positioned to face upward, an insulating layer is formed so as to cover the core board and the ceramic electronic component, a laser beam is used to form a via hole that reaches the surface of the external terminal electrode, and then the via hole is filled with a conductor to electrically connect a wiring circuit with the external terminal electrode.

In the above burying, accurate laser beam irradiation is required. This is because there is a possibility that the characteristics of the ceramic electronic component are changed if the ceramic element assembly is erroneously irradiated with the laser beam.

Thus, the area of the external terminal electrode of the buried ceramic electronic component is desirably as large as possible. For example, in the monolithic ceramic electronic component of a type described in Japanese Unexamined Patent Application Publication No. 2006-216622 and Japanese Unexamined Patent Application Publication No. 2006-339337, as shown in FIG. 17, it is necessary to design external terminal electrodes 2 and 3 and increase the areas thereof as much as possible with leaving only a necessary gap 1.

However, when the break method of breaking along a predetermined break line in which break grooves like discontinuous perforations are formed is used to manufacture the ceramic electronic components in which a plurality of external terminal electrodes having narrow gaps between them are formed as described above, it is found that "break defects" tend to occur. A "break defect" is where a portion of a side surface of a ceramic element assembly formed during breaking along a gap portion is not broken properly, and, therefore, a protrusion (dent at the opposite side) is formed at the side surface, or a crack or a chip occurs in the ceramic element assembly starting from the gap portion.

As described in Japanese Unexamined Patent Application Publication No. 2003-273272, it is highly likely that no recess for leading a break is formed at a narrow gap portion and two adjacent recesses for leading a break are arranged with the gap portion placed in between when discontinuous equal-sized recesses for leading a break are formed at an equal pitch. In this case, it is easy to concentrate tensile stress between adjacent recesses for leading a break in external terminal electrode forming portions that occupy the majority of the principal surface, but it is difficult to concentrate tensile stress on a gap portion that has a narrow area and that is located at a level slightly lower than the external terminal electrode forming portion. For this reason, it is predictable that "break defect" tends to occur starting from the gap portion.

SUMMARY OF THE INVENTION

It is an object of the invention to provide a ceramic electronic component, a method of manufacturing the same, and a collective component from which a plurality of ceramic electronic components may be obtained, which are able to eliminate the above described problems.

According to preferred embodiments of the invention, a ceramic electronic component includes: a ceramic element assembly that has mutually opposite first and second principal surfaces and first to fourth side surfaces that connect the first and second principal surfaces; and an external conductor that is formed at least on the first principal surface of the ceramic element assembly.

In the ceramic electronic component, a plurality of recessed grooves are formed at least on the first side surface so as to extend in a direction to connect the first and second principal surfaces and at least reach the first principal surface. Note that these recessed grooves can correspond to halves of break leading holes provided along a predetermined break line so as to lead a break in a collective component.

A first edge portion of the first principal surface, which contacts the first side surface, has at least two first regions in which an edge of the external conductor is located; and at least one second region which is located between the adjacent at least two first regions and in which the edge of the external conductor is not located.

The plurality of recessed grooves includes at least one extending recessed groove located so as to extend over the first regions and the second region.

In the second region, the adjacent recessed grooves may partially overlap each other or may be independent of each other.

In the preferred embodiments of the invention, the external conductor includes a first external conductor of which the edge is located in any one of the at least two first regions and a second external conductor of which the edge is located in the other one of the at least two first regions, and the first external conductor and the second external conductor are formed on the first principal surface independently of each other.

In the above preferred embodiments, when the ceramic electronic component according to the preferred embodiments of the invention constitutes a monolithic ceramic capacitor that includes a plurality of laminated dielectric layers and first and second internal electrodes that are provided so as to face each other via each of the dielectric layers, the first external conductor is electrically connected to the first internal electrode, and the second external conductor is electrically connected to the second internal electrode.

When the ceramic electronic component constitutes a monolithic ceramic capacitor, the dielectric layers and the first and second internal electrodes may extend vertically with respect to the first principal surface or may extend parallel to the first principal surface. In the latter case, the first external conductor is electrically connected to each first internal electrode via a first via conductor, and the second external conductor is electrically connected to each second internal electrode via a second via conductor.

In the ceramic electronic component according to the preferred embodiments of the invention, the plurality of recessed grooves may be formed so as to reach both the first and second principal surfaces or may be formed so as to reach only the first principal surface.

In addition, the pitch between the extending recessed groove and the other recessed grooves adjacent to the extending recessed groove is desirably smaller than the pitch of the other recessed grooves. Alternatively, the recessed grooves may be arranged at a constant pitch.

The preferred embodiments of the invention may also be applied to a ceramic electronic component in which the external conductor is additionally formed on the second principal surface.

In the ceramic electronic component according to the preferred embodiments of the invention, a second edge portion of the first principal surface, which contacts the second side surface facing the first side surface, may also have a similar configuration to the first edge portion.

When the ceramic electronic component according to the preferred embodiments of the invention is buried in a wiring board and used, and a conductor that fills a via hole formed by a laser beam to reach the external conductor is formed in the wiring board, at least a surface of the external conductor is desirably made of Cu.

Preferred embodiments of the invention are also directed to a method of manufacturing the above described ceramic electronic component.

According to the preferred embodiments of the invention, the method of manufacturing a ceramic electronic component includes: preparing a collective component; and obtaining a plurality of ceramic electronic components by dividing the collective component along a predetermined break line. The collective component has mutually opposite first and second principal surfaces, an external conductor is formed at least on the first principal surface, a plurality of break leading holes are formed so as to extend in a direction to connect the first and second principal surfaces, each of the break leading holes has an open end located at least on the first principal surface, and the plurality of break leading holes are arranged so as to be distributed along the break line.

Note that it is only necessary that each of the break leading holes has an open end that is located at least on the first principal surface. Thus, each of the break leading holes may be formed of a through-hole portion that has an open end on each of the first and second principal surfaces and extends through the collective component in the thickness direction or may be formed of a recessed portion that has an open end only on the first principal surface and that does not extend through the collective component in the thickness direction.

The collective component, when viewed from a side of the first principal surface, has a first region that intersects with the external conductor in the break line and a second region that does not intersect with the external conductor in the break line.

The plurality of break leading holes include at least one extending break leading hole located so as to extend over the first region and the second region.

The preferred embodiments of the invention may also be directed to a collective component that is advantageously used in the above described method of manufacturing a ceramic electronic component, and more specifically, a collective component from which a plurality of ceramic electronic components may be obtained by dividing the collective component along a predetermined break line.

The collective component according to the preferred embodiments of the invention includes: mutually opposite first and second principal surfaces; an external conductor formed at least on the first principal surface, and a plurality of break leading holes being formed so as to extend in a direction to connect the first and second principal surfaces. Each of the break leading holes has an open end that is located at least on the first principal surface. The plurality of break leading holes are arranged to be distributed along the break line.

The collective component, when viewed from a side of the first principal surface, has a first region that intersects with the external conductor in the break line and a second region that does not intersect with the external conductor in the break line.

The plurality of break leading holes include at least one extending break leading hole located so as to extend over the first region and the second region.

According to the preferred embodiments of the invention, when a collective component is broken along a predetermined break line in which a plurality of break leading holes are arranged in order to obtain a ceramic electronic component in which an edge portion of a principal surface of a ceramic element assembly which contacts one side surface has at least two first regions in which an edge of an external conductor is located, and at least one second region which is located between the adjacent two first regions and in which no edge of the external conductor is located, like a ceramic electronic component in which a plurality of external terminal electrodes having narrow gaps are formed on a principal surface, for example, a smooth break is possible, and "break defect", such as occurrence of a protrusion or a dent at a side surface of the ceramic element assembly or occurrence of a crack or a chip in the ceramic element assembly, hardly occurs.

Accordingly, where the ceramic electronic component is contained inside a wiring board so that the external conductor formed on the principal surface of the ceramic electronic component, for example, faces upward, part of the wiring board is perforated by a laser beam to form a via hole that reaches the surface of the external conductor, and then the via hole is filled with a conductor. In carrying out a process where a wiring circuit is electrically connected to the external conductor, even when the area of the external conductor of the buried ceramic electronic component is increased in order to avoid high the need for accuracy in laser beam irradiation, it is possible to smoothly and suitably break a collective component for obtaining such an electronic component.

Other features, elements, characteristics and advantages of the present invention will become more apparent from the following detailed description of preferred embodiments of the present invention with reference to the attached drawings.

BRIEF DESCRIPTION OF THE DRAWINGS

FIG. 3A and FIG. 3B are LT cross-sectional views of the monolithic ceramic capacitor shown in FIG. 1, in which FIG. 3A shows a cross section in which a first internal electrode is present, and FIG. 3B shows a cross section in which a second internal electrode is present;

FIG. 12A and FIG. 12B are views, corresponding to FIG. 3A and FIG. 3B, for illustrating a sixth embodiment of the invention, in which FIG. 12A shows a cross section in which a first internal electrode is present, and FIG. 12B shows a cross section in which a second internal electrode is present;

FIG. 14A and FIG. 14B are LW cross-sectional views of the monolithic ceramic capacitor shown in FIG. 13, in which FIG. 14A shows a cross section in which a first internal electrode is present, and FIG. 14B shows a cross section in which a second internal electrode is present;

DESCRIPTION OF THE PREFERRED EMBODIMENTS

Figure 1:
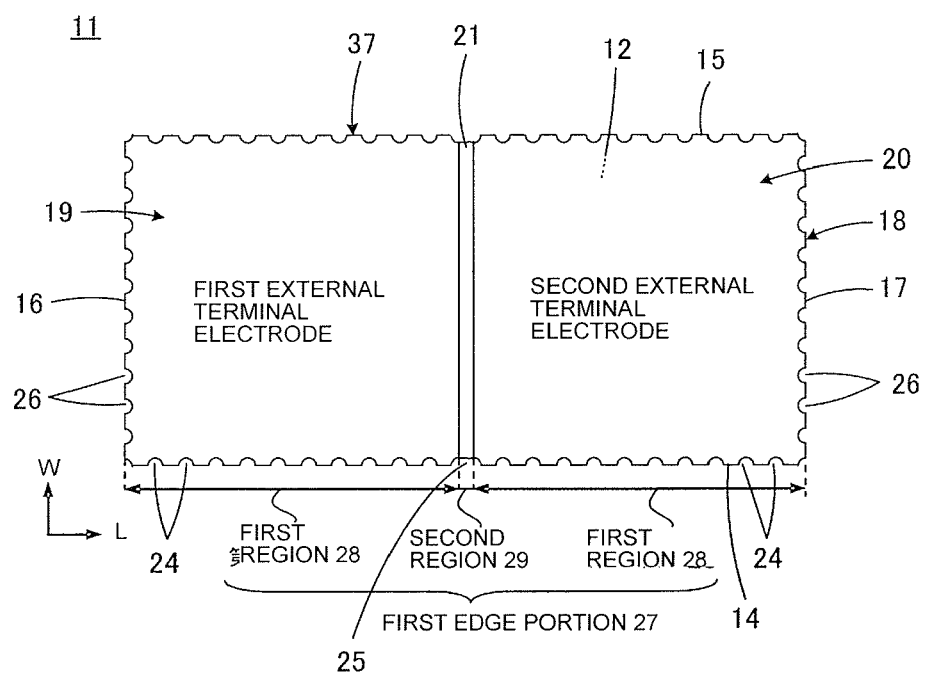
FIG. 1 is a plan view that shows a monolithic ceramic capacitor, which is a ceramic electronic component according to a first embodiment of the invention.
Figure 2:
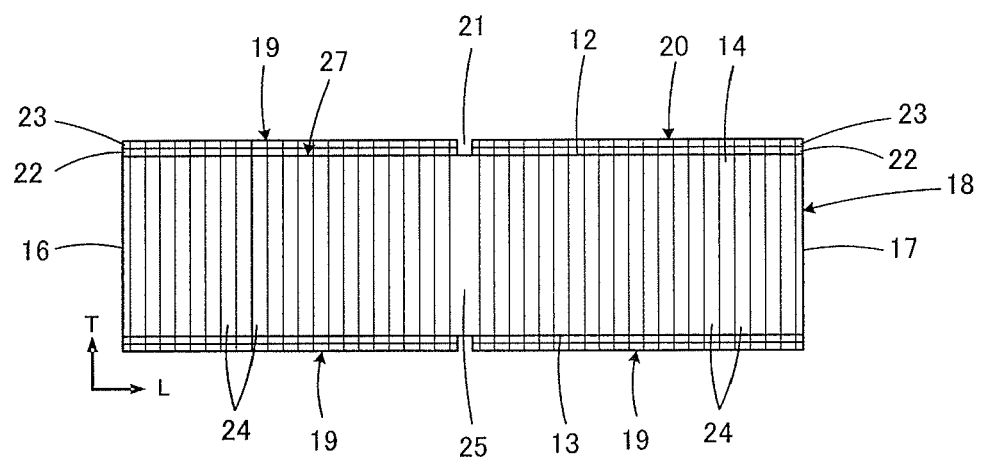
FIG. 2 is a front view of the monolithic ceramic capacitor shown in FIG. 1.
Figure 3:
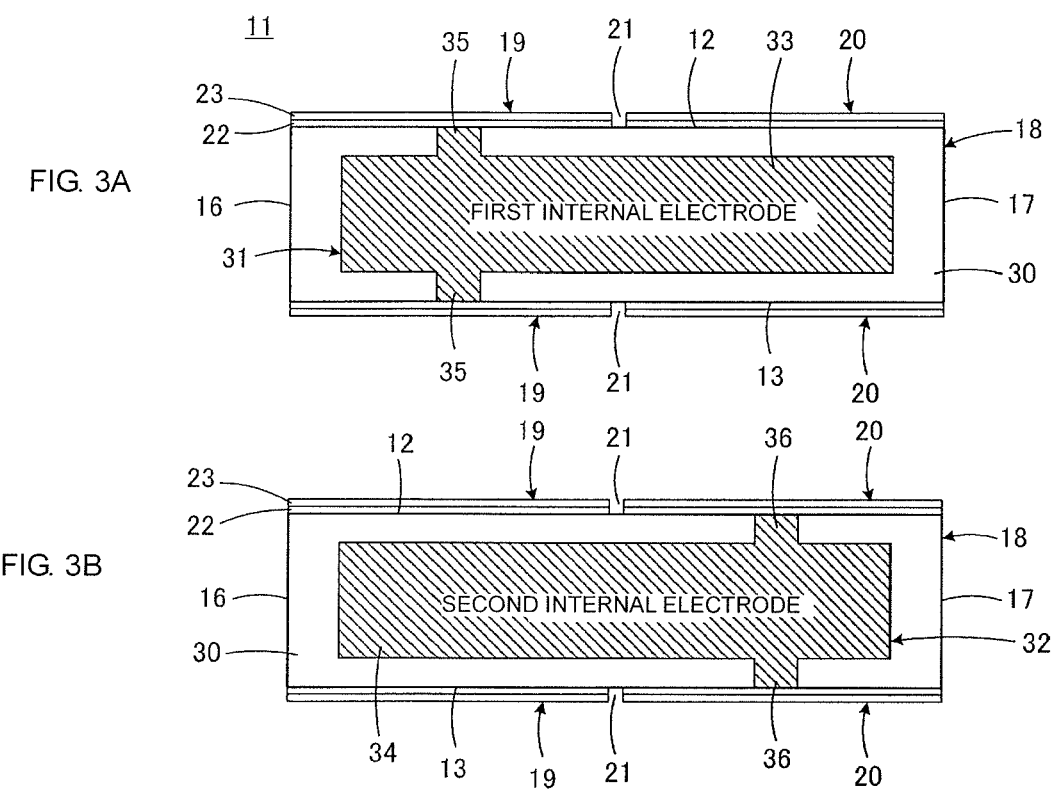
Figure 4:
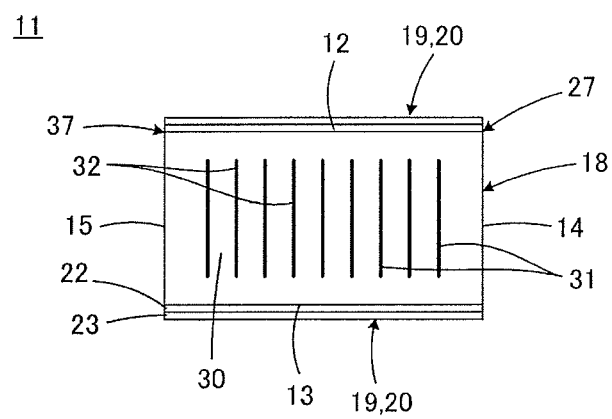
FIG. 4 is a WT cross-sectional view of the monolithic ceramic capacitor shown in FIG. 1.

FIG. 1 to FIG. 4 show a monolithic ceramic capacitor 11, which serves as a ceramic electronic component according to a first embodiment of the invention. Here, FIG. 1 is a plan view. FIG. 2 is a front view. FIG. 3A, FIG. 3B and FIG. 4 are cross-sectional views. Note that in FIG. 1 and FIG. 2, L, W and T respectively indicate a longitudinal direction, a width direction and a thickness direction. FIG. 3A and FIG. 3B are LT cross-sectional views. FIG. 4 is a WT cross-sectional view. In addition, FIG. 3A and FIG. 3B show different cross sections from each other.

As shown in FIG. 1 and FIG. 2, the monolithic ceramic capacitor 11 includes a capacitor body 18 which serves as a ceramic element assembly, having mutually opposite first and second principal surfaces 12 and 13 and first to fourth side surfaces 14 to 17 that connect the first and second principal surfaces 12 and 13.

In addition, first and second external terminal electrodes 19 and 20, which serve as external conductors, are independently formed on the first principal surface 12 of the capacitor body 18 and separated by a gap 21, and first and second external terminal electrodes 19 and 20 are similarly formed on the second principal surface 13 as well. The first and second external terminal electrodes 19 and 20 each include a base layer 22 and a plating film 23 formed on the base layer 22.

A plurality of recessed grooves 24 and 25 are formed on each of the first and second side surfaces 14 and 15 of the capacitor body 18. The recessed grooves 24 and 25 are formed so as to extend in a direction to connect the first and second principal surfaces 12 and 13 and reach both the first and second principal surfaces 12 and 13. Recessed grooves 26 are also formed on the third and fourth side surfaces 16 and 17 of the capacitor body 18.

Two first regions 28 and one second region 29 are formed at a first edge portion 27 of the first principal surface 12, which contacts the first side surface 14. An edge of the first or second external terminal electrode 19 or 20 is located in each of the first regions 28. The second region 29 is located between the adjacent two first regions 28, and neither an edge of the first external terminal electrode 19 nor an edge of the second external terminal electrode 20 is located in the second region 29.

As shown in FIG. 3A, FIG. 3B and FIG. 4, the monolithic ceramic capacitor 11 includes a plurality of laminated dielectric layers 30 and a plurality of pairs of first and second internal electrodes 31 and 32 that are provided so as to face each other via each of the dielectric layers 30. In this embodiment, the dielectric layers 30 and the first and second internal electrodes 31 and 32 extend vertically with respect to the first principal surface 12, that is, with respect to a mounting surface. The first and second internal electrodes 31 and 32 respectively have capacitive portions 33 and 34 and extended portions 35 and 36, and are electrically connected to the first and second external terminal electrodes 19 and 20, respectively.

Figure 5:
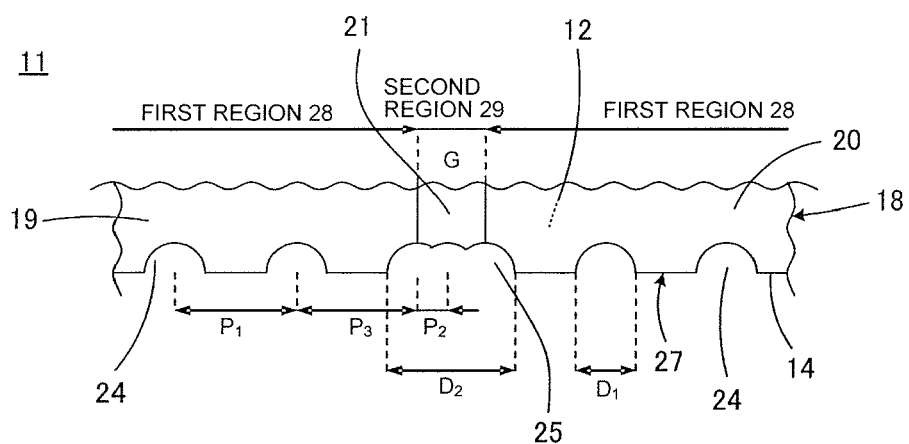
FIG. 5 is a partially enlarged view of FIG. 1.

FIG. 5 is a partially enlarged view of FIG. 1. As best seen in FIG. 5, the above described plurality of recessed grooves 24 and 25 are classified into: an extending recessed groove 25 located so as to extend over the first regions 28 and the second region 29; and recessed grooves 24 which are not extending recessed grooves.

Each of the recessed grooves 24 has a substantially semicircular shape having a length of $D_1$ along the first edge portion 27, and the plurality of recessed grooves 24 are arranged at an equal pitch $P_1$. Here, the pitch means a distance between median points of the adjacent recessed grooves 24 along the first edge portion 27. Note that the shape of each recessed groove 24 is not limited to the substantially semicircular shape shown in the drawing, and may be substantially triangular, rectangular, oblong, or the like.

The extending recessed groove 25 has a length of $D_2$ along the first edge portion 27, and has a configuration in which three cross-sectionally substantially semicircular grooves having the same area are continuously arranged at a pitch $P_2$ so as to partially overlap each other. In this embodiment, the extending recessed groove 25 is formed entirely over the entire second region 29. Thus, an extending recessed groove 25 located so as to extend over one first region 28 and the second region 29, and an extending recessed groove 25 located so as to extend over the other first region 28 and the second region 29, can be parts of the same groove. Note that the cross-sectionally substantially semicircular grooves that constitute the extending recessed groove 25 may be replaced by grooves having a cross section that is substantially triangular, rectangular, oblong, or the like.

Where the pitch of the adjacent recessed grooves 24 is $P_1$, and the pitch of the adjacent grooves that constitute the extending recessed groove 25 is $P_2$, the relationship $P_1 > P_2$ is desirably satisfied. Recessed grooves 24 and 25 correspond to half of break leading holes 48 and 49 (see FIG. 7) after a break process is done during manufacturing, as will be described later. In this way, the pitch of break leading holes is reduced in the second region 29 that corresponds to a gap 21 portion between the first and second external terminal electrodes 19 and 20. Thus, a smooth break is possible, and it is possible to reliably suppress structural defects.

Note that a pitch $P_3$ between a recessed groove 24 and the adjacent outermost cross-sectionally substantially semicircular groove that constitutes the extending recessed groove 25, desirably satisfies the relationship $P_1 \geq P_3$. By so doing, break leading holes concentrate around the extending recessed groove 25, so a further smooth break is possible.

Other preferred conditions relating to the dimensions are as follows.

The length $D_1$ of each recessed groove 24 excluding extending recessed groove 25 is desirably about 80 to 120 μm.

The length $D_2$ of the extending recessed groove 25 is desirably about 160 to 240 μm.

The pitch $P_1$ of the recessed grooves 24 other than the extending recessed groove 25 is desirably about 150 to 250 μm.

The pitch $P_2$ of the cross-sectionally substantially semicircular grooves that constitute the extending recessed groove 25 is desirably about 40 to 60 μm.

The pitch $P_3$ between the adjacent first recessed groove 24 and outermost cross-sectionally substantially semicircular groove that constitutes the extending recessed groove 25, is desirably about 150 to 250 μm.

Recessed grooves 26 formed at the third side surface 16 of the capacitor body 18 and recessed grooves 26 formed at the fourth side surface 17 of the capacitor body 18 are desirably arranged at substantially equal pitch, respectively.

The size G of the gap 21, which corresponds to the length of the second region 29, is desirably about 140 to 160 μm.

It is desirable that $D_1 < G$.

It is desirable that $D_2 \geq G$.

In this embodiment, the first and second regions 28 and 29 are also present in a second edge portion 37, as well as the first edge portion 27, of the first principal surface 12. The second edge portion 37 contacts the second side surface 15 facing the first side surface 14, and the recessed grooves 24 and 25 satisfy a relationship similar to that of the first edge portion 27. However, the embodiment of the invention may be applied to an edge portion at which the second region is present, and it is only necessary that at least one edge portion satisfies the above described relationship.

In addition, the arrangement of the first and second external terminal electrodes 19 and 20 and recessed grooves 24, 25 and 26 is similar between the first principal surface 12 and the second principal surface 13.

The thickness of the capacitor body 18 is desirably about 0.3 to 1.5 mm.

Dielectric ceramics that constitute the dielectric layers 30 provided in the capacitor body 18 may employ a material that contains $BaTiO_3$, $CaTiO_3$, $SrTiO_3$, $CaZrO_3$, or the like, as a main component. In addition, a material that adds an accessory component to any one of these main components, such as a Mn compound, a Fe compound, a Cr compound, a Co compound, and a Ni compound, may also be used. The thickness of each dielectric layer 30 is desirably about 1 to 10 μm.

A conductive component that constitutes the internal electrodes 31 and 32 may, for example, employ a metal, such as Ni, Cu, Ag, Pd, Ag—Pd alloy, and Au. The thickness of each of the internal electrodes 31 and 32 is desirably about 1 to 10 μm.

A conductive component that constitutes the base layer 22 of each of the external terminal electrodes 19 and 20 may, for example, employ a metal, such as Ni, Cu, Ag, Pd, Ag—Pd alloy, and Au. The base layers 22 are formed using a thick-film conductor made of a sintered metal or formed by direct plating. The base layers 22 may contain a glass or may contain ceramics of the same kind as the ceramics that constitute the dielectric layers 30. The thickness of each base layer 22 is desirably about 5 to 40 µm.

A metal that constitutes the plating film 23 of each of the external terminal electrodes 19 and 20 may, for example, employ Ni, Cu, Sn, Sn—Pb alloy, and Au. A plurality of the plating films 23 may be formed. The thickness of each plating film 23 per one layer is desirably about 1 to 10 µm. In addition, although not shown in the drawing, a resin layer for reducing stress may be formed between the base layer 22 and the plating film 23.

When the ceramic electronic component according to the embodiment of the invention is buried in the wiring board, at least the surface of the external conductor is desirably formed of Cu. For example, when the monolithic ceramic capacitor 11 according to this embodiment is buried in the wiring board, the plating film 23 that constitutes the outermost layer of each of the external terminal electrodes 19 and 20 is desirably formed of Cu plating. As described in Japanese Unexamined Patent Application Publication No. 2005-064446, at the time of burying the ceramic electronic component, the insulating layer of the wiring board is perforated by a laser beam to form a via hole that reaches the surface of the external terminal electrode. However, Cu plating tends to reflect a laser (particularly, $CO_2$ laser) beam, so it is possible to suppress damage to a component by a laser beam.

Next, an example of a manufacturing process of the monolithic ceramic capacitor 11 will be described.

(1) Ceramic green sheets, a conductive paste for internal electrodes and a conductive paste for external terminal electrodes are prepared. These ceramic green sheets and conductive pastes contain binder and solvent. One may employ known organic binders and known organic solvents, respectively.

(2) The conductive paste for internal electrodes is printed on the ceramic green sheets in a predetermined pattern by screen printing, for example, to form a conductive paste film for internal electrodes.

(3) Predetermined numbers of the ceramic green sheets on which the conductive paste film for internal electrodes is printed are laminated, and then predetermined numbers of ceramic green sheets for outer layers, on which no conductive paste for internal electrodes is printed, are further laminated on both upper and lower sides of the laminated ceramic green sheets, thus preparing a raw collective component. The raw collective component is, when necessary, pressure-bonded in the laminated direction by means of isostatic pressing, or the like.

Figure 6:
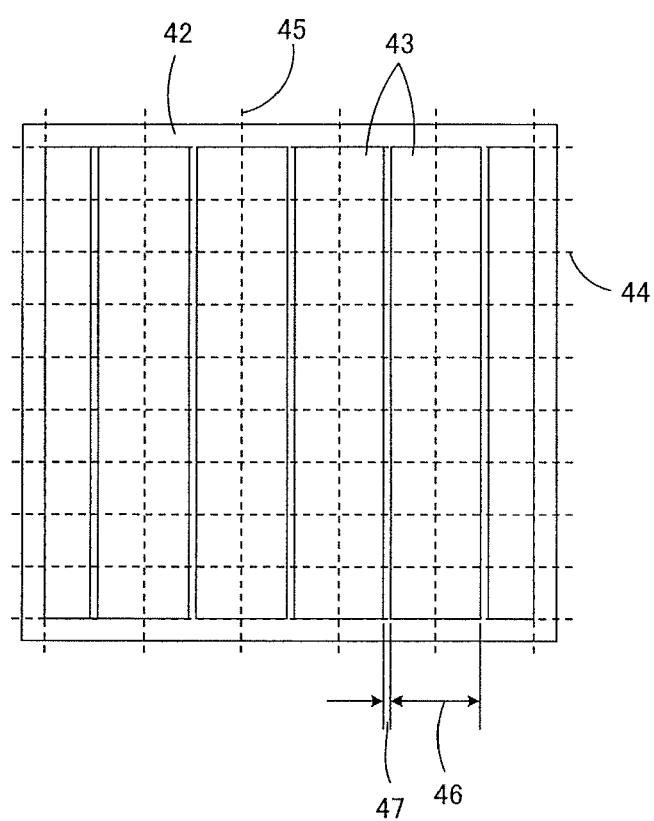
FIG. 6 is a plan view that shows a state where conductive paste films for external terminal electrodes are formed on a first principal surface of a collective component that is prepared for manufacturing the monolithic ceramic capacitor shown in FIG. 1.

(4) As shown in FIG. 6, a conductive paste for external terminal electrodes is printed on the first principal surface 42 of the raw collective component 41 in a predetermined pattern by means of screen printing, or the like, to form a conductive paste film 43 for external terminal electrodes. By breaking the collective component 41 along break lines 44 and 45 indicated by broken line, a plurality of the monolithic ceramic capacitors 11 may be obtained from the collective component 41. When viewed from the first principal surface 42 side, the collective component 41 includes first regions 46 that intersect with the conductive paste films 43 for external terminal electrodes in the break lines 44 and second regions 47 that do not intersect with the conductive paste films 43 for external terminal electrodes in the break lines 44.

Conductive paste films for external terminal electrodes are similarly formed on the second principal surface, which is opposite the first principal surface 42 of the raw collective component 41.

Figure 7:
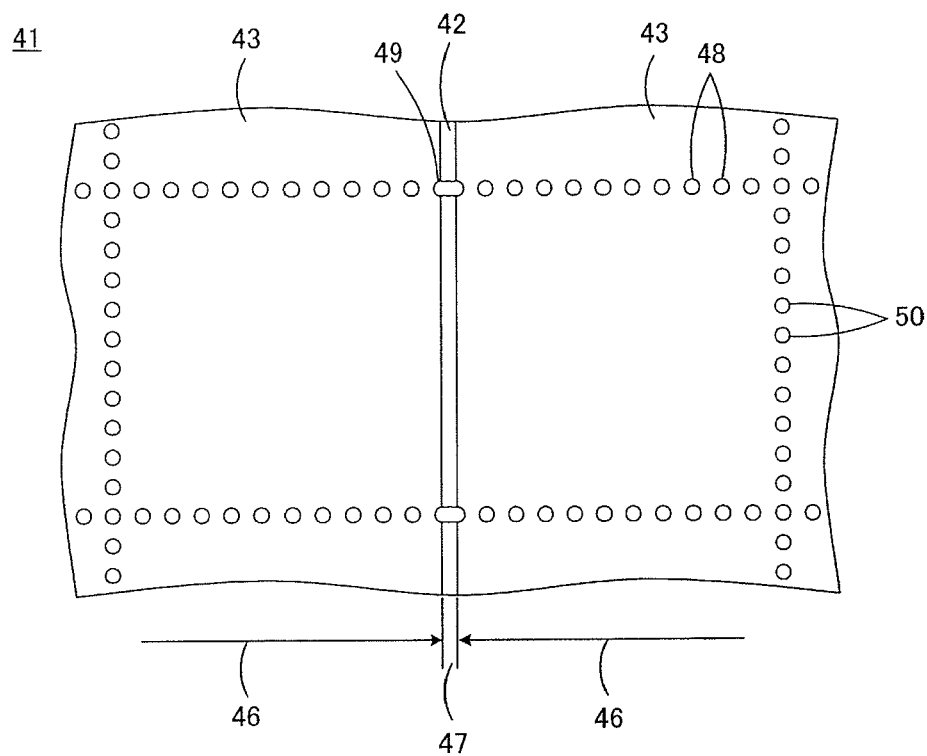
FIG. 7 is an enlarged plan view that shows a state where a plurality of break leading holes are formed in the collective component shown in FIG. 6.

(5) As shown by the enlarged view in FIG. 7, the plurality of break leading holes 48 to 50 are formed in the collective component 41. The break leading holes 48 to 50 are formed so as to extend in a direction to connect the first principal surface 42 to the second principal surface. In this embodiment, the break leading holes 48 to 50 extend through between the first principal surface 42 and the second principal surface, and open ends of the break leading holes 48 to 50 are located on the first principal surface 42 and the second principal surface. The plurality of break leading holes 48 to 50 are arranged so as to be distributed along the break lines 44 and 55. The plurality of break leading holes 48 to 50 include so-called perforations.

In addition, when the collective component 41 is viewed as a whole, the plurality of break leading holes 48 in this embodiment are arranged at a constant pitch in a direction parallel to the first and second side surfaces 14 and 15 of the capacitor body 18 of each monolithic ceramic capacitor 11 to be obtained. On the other hand, the plurality of break leading holes 50 are arranged at a constant pitch in a direction parallel to the third and fourth side surfaces 16 and 17 of the capacitor body 18.

In addition, the break leading hole 49 is located so as to extend over the above described first regions 46 and second region 47, and has a configuration in which three cross-sectionally substantially semicircular holes having the same area are arranged so as to partially overlap each other. Hereinafter, the "break leading hole 49" may be referred to as "extending break leading hole 49". It is desirable that the diameter of each of the cross-sectionally substantially semicircular holes and the diameter of each of the break leading holes 48 and 50 are the same.

The break leading holes 48 to 50 may be formed using a laser, an NC punch, or the like.

As shown in FIG. 7, when viewed in a direction in which the break leading holes 48 and 49 are distributed, portions at which the conductive paste films 43 for external terminal electrode are printed are the first regions 46 shown in FIG. 6 and ultimately become the first regions 28 in the monolithic ceramic capacitor 11. The plurality of break leading holes 48 are formed at the portions.

In FIG. 7, similarly, when viewed in a direction in which the break leading holes 48 and 49 are distributed, a portion at which no conductive paste film 43 for external terminal electrode is printed is the second region 47 shown in FIG. 6 and ultimately becomes the second region 29 in the monolithic ceramic capacitor 11. The extending break leading hole 49 is formed at the portion.

Figure 10:
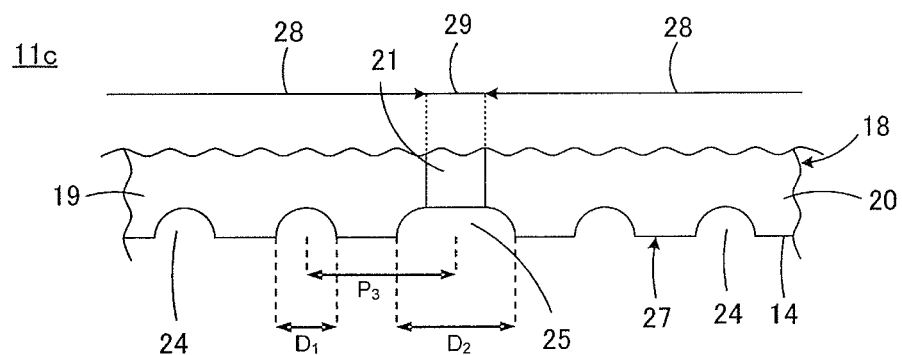
FIG. 10 is a view, corresponding to FIG. 5, for illustrating a fourth embodiment of the invention.

In order to form the extending recessed groove 25 shown in FIG. 5, it is only necessary, for example, that the extending break leading hole 49 is formed by forming a plurality of holes by repeating laser irradiation at a narrowed irradiation pitch. In addition, in order to form the extending recessed groove 25 as shown in FIG. 10, which will be described later, it is only necessary that the extending break leading hole 49 is formed by moving a laser beam at a predetermined distance upon laser beam irradiation.

In order to form a hole pinpointed to a gap portion by a single laser beam irradiation, for example, it can be necessary to form a hole by sensing the gap portion each time. Thus, the process time for forming a break leading hole elongates.

However, if a plurality of narrow pitch holes or a long hole is formed as described above, even when a position deviation slightly occurs, it is possible to reliably arrange the hole(s) at the gap portion. Thus, it is possible to reduce the process time for forming break leading holes.

(6) The raw collective component 41 is fired. A firing temperature depends on the materials of the ceramic green sheets, the conductive paste for internal electrodes and the conductive paste for external terminal electrodes; however, it is desirably, for example, about 900 to 1300° C. Thus, ceramics contained in the ceramic green sheets and the conductive paste for internal electrodes are sintered to form the capacitor body 18, while the conductive paste for external terminal electrodes is also sintered to form the base layers 22 of the external terminal electrodes 19 and 20 on the capacitor body 18.

(7) Plating is applied to the collective component 41 to form a plating film 23 on the base layer 22 of each of the external terminal electrodes 19 and 20.

Note that the embodiment of the invention is specifically significant when electrolytic plating is applied. This is because the first and second external terminal electrodes 19 and 20 of each monolithic ceramic capacitor 11 in the collective component 41 to be obtained are connected to each other at portions other than the break leading holes 48 to 50, and the external terminal electrodes may be supplied with electric current only by connecting feeding terminals for electrolytic plating to the first and second external terminal electrodes 19 and 20 of the monolithic ceramic capacitor 11 arranged at the peripheral portion of the collective component 41.

(8) While in the state of the collective component 41, the characteristics of the plurality of monolithic ceramic capacitors 11 to be obtained can be respectively measured.

(9) The collective component 41 is divided along the break lines 44 and 45 to obtain the plurality of monolithic ceramic capacitors 11.

Note that the base layers 22 of the external terminal electrodes 19 and 20 may be formed by sintering simultaneously with sintering for obtaining the capacitor body 18 as described above or the base layers 22 may be formed so that, after sintering for obtaining the capacitor body 18, a conductive paste is applied and baked before breaking.

Figure 8:
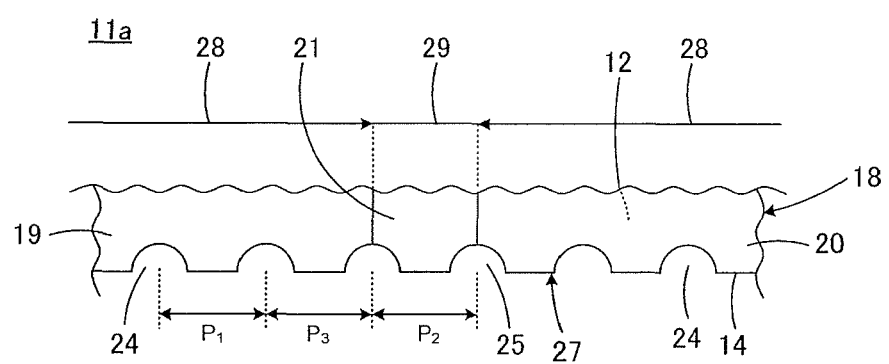
FIG. 8 is a view, corresponding to FIG. 5, for illustrating a second embodiment of the invention.

FIG. 8 is a view, corresponding to FIG. 5, for illustrating a second embodiment of the invention. In FIG. 8, like reference numerals denote components corresponding to the components shown in FIG. 5, and the overlapping description is omitted.

In a monolithic ceramic capacitor 11a shown in FIG. 8, the configuration in which the extending recessed groove 25 is formed is different from that shown in FIG. 5. That is, in the monolithic ceramic capacitor 11a, the two extending recessed grooves 25 are formed. The two extending recessed grooves 25 are formed independently of each other; one of the extending recessed grooves 25 is located so as to extend over one first region 28 and the second region 29; and the other extending recessed groove 25 is located so as to extend over the other first region 28 and the second region 29.

In the case of this embodiment, the pitch $P_2$ of the extending recessed grooves 25, the arrangement pitch $P_1$ of the other recessed grooves 24 and the arrangement pitch $P_3$ between the adjacent recessed grooves 24 and 25 are equalized with each other. Because there is no need to change pitches of laser beam irradiation, NC punch, and the like when the recessed grooves 24 and 25 are formed, it is possible to improve the manufacturing efficiency.

Figure 9:
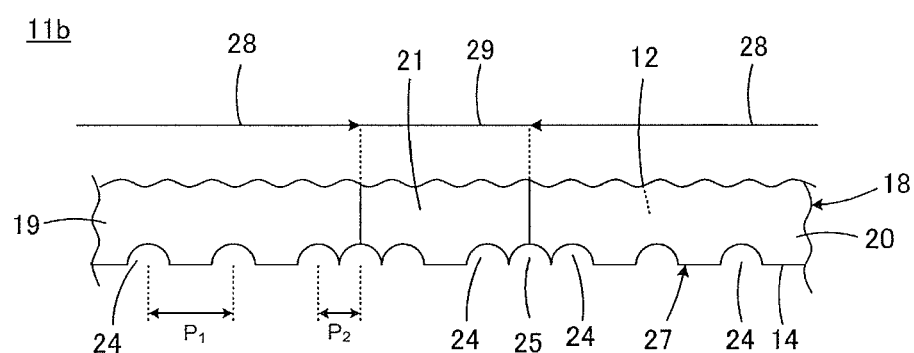
FIG. 9 is a view, corresponding to FIG. 5, for illustrating a third embodiment of the invention.

FIG. 9 is a view, corresponding to FIG. 5, for illustrating a third embodiment of the invention. In FIG. 9, like reference numerals denote components corresponding to the components shown in FIG. 5, and the overlapping description is omitted.

In a monolithic ceramic capacitor 11b shown in FIG. 9, the recessed grooves 24 are connected to both sides of each of the extending recessed grooves 25, and the three continuous recessed grooves 24 and 25 are formed at each boundary region between the first regions 28 and the second region 29.

In this embodiment, the arrangement pitch $P_2$ between the extending recessed grooves 25 and the other recessed grooves 24 adjacent to the extending recessed grooves 25 is smaller than the arrangement pitch $P_1$ of the recessed grooves 24 other than the extending recessed grooves 25. Because the recessed grooves 24 and 25 concentrate on each boundary region between the first regions 28 and the second region 29, a smooth break is possible and, therefore, it is possible to suppress structural defects.

FIG. 10 is a view, corresponding to FIG. 5, for illustrating a fourth embodiment of the invention. In FIG. 10, like reference numerals denote components corresponding to the components shown in FIG. 5, and the overlapping description is omitted.

In a monolithic ceramic capacitor 11c shown in FIG. 10, the extending recessed groove 25 is located so as to extend over the first regions 28 and the second region 29, and is not formed of a plurality of substantially semicircular continuous grooves overlapping each other as shown in FIG. 5, but formed of a single independent recessed groove. Where the length of each recessed groove 24 other than the extending recessed groove 25 along the first edge portion 27 is $D_1$, and the length of the extending recessed groove 25 along the first edge portion 27 is $D_2$, the relationship $D_1 < D_2$ is desirably satisfied.

In a collective component for obtaining the monolithic ceramic capacitors 11c that satisfies the above condition, a plurality of break leading holes are formed as break leading holes in regions corresponding to the first regions 28 so as not to reach a region corresponding to the second region 29 which corresponds to a gap 21 portion between the external terminal electrodes 19 and 20, and an extending break leading hole is formed as a break leading hole in a region corresponding to the second region 29. The length (corresponding to $D_2$) of the extending break leading hole along a break line is longer than the length (corresponding to $D_1$) of each of the other break leading holes along a break line.

In this embodiment, a smooth break is possible and, therefore, it is possible to suppress structural defects.

Note that in this embodiment, as in the case of the first embodiment, the length $D_1$ of each recessed groove 24 is desirably about 80 to 120 μm, the length $D_2$ of the extending recessed groove 25 is desirably about 160 to 240 μm, the pitch $P_1$ of the recessed grooves 24 is desirably about 150 to 250 μm, the pitch $P_3$ between the adjacent first recessed groove 24 and extending recessed groove 25 is desirably about 150 to 250 μm, the size G of the gap 21 corresponding to the length of the second region 29 is desirably about 140 to 160 μm, the relationship $D_1 < G$ is desirably satisfied, and the relationship $D_2 \geq G$ is desirably satisfied.

Figure 11:
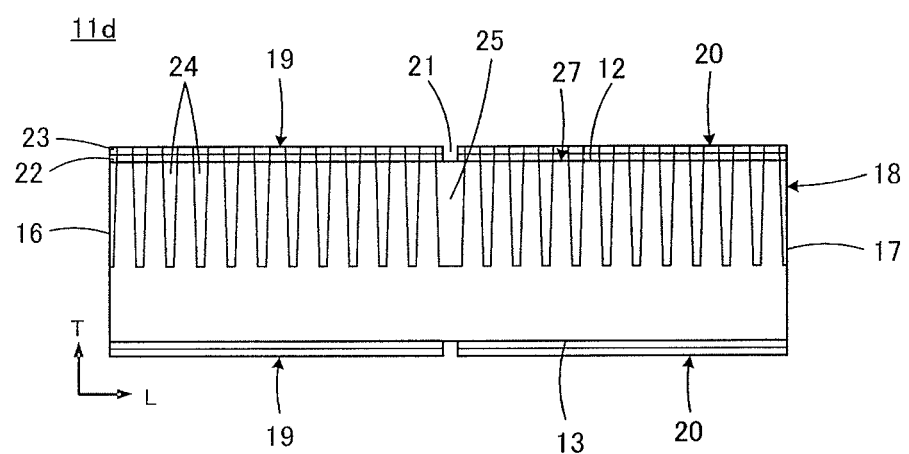
FIG. 11 is a view, corresponding to FIG. 2, for illustrating a fifth embodiment of the invention.

FIG. 11 is a view, corresponding to FIG. 2, for illustrating a fifth embodiment of the invention. In FIG. 11, like reference numerals denote components corresponding to the components shown in FIG. 2, and the overlapping description is omitted.

In a monolithic ceramic capacitor 11d shown in FIG. 11, the recessed grooves 24 and 25 are formed so as to reach only the first principal surface 12 and not to reach the second principal surface 13.

In a collective component for obtaining the monolithic ceramic capacitors lid having the above configuration, the break leading holes are formed so as not to reach the second principal surface. If a large number of perforated break leading holes are formed, breaking is easy, whereas there is a problem that a collective component can be unintentionally broken while handling the collective component in a manufacturing process. In contrast, it is possible to suppress an undesirable break of a collective component when handling the collective component by forming the break leading holes in a half-perforated state.

In addition, as shown in FIG. 11, the recessed grooves 24 and 25 may have a tapered shape when viewed in cross section. For example, when break leading holes which will be the recessed grooves 24 and 25 are formed by a laser beam, because of attenuation of energy of laser beam, the intensity of laser beam weakens as a location is distanced from the incident position. As a result, the break leading holes have a tapered shape. Note that a tapered shape may be not only applied to the case of half-perforated break leading holes but also applied to the case of completely perforated break leading holes that correspond to the recessed grooves 24 and 25 as shown in FIG. 2.

Figure 12:
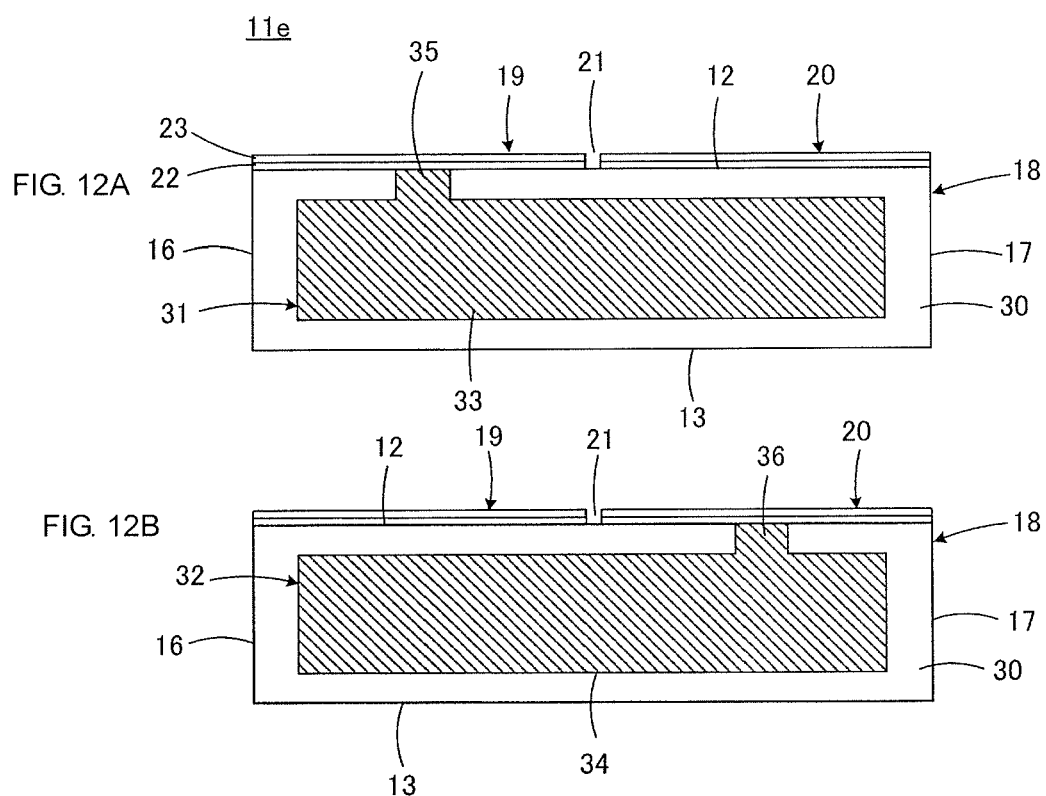

FIG. 12A and FIG. 12B are views, corresponding to FIG. 3A and FIG. 3B, for illustrating a sixth embodiment of the invention. In FIG. 12A and FIG. 12B, like reference numerals denote components corresponding to the components shown in FIG. 3A and FIG. 3B, and the overlapping description is omitted.

In a monolithic ceramic capacitor 11e shown in FIG. 12A and FIG. 12B, the first and second external terminal electrodes 19 and 20 are formed only on the first principal surface 12. In this type of monolithic ceramic capacitor lie as well, the embodiments of the invention can effectively function.

Figure 13:
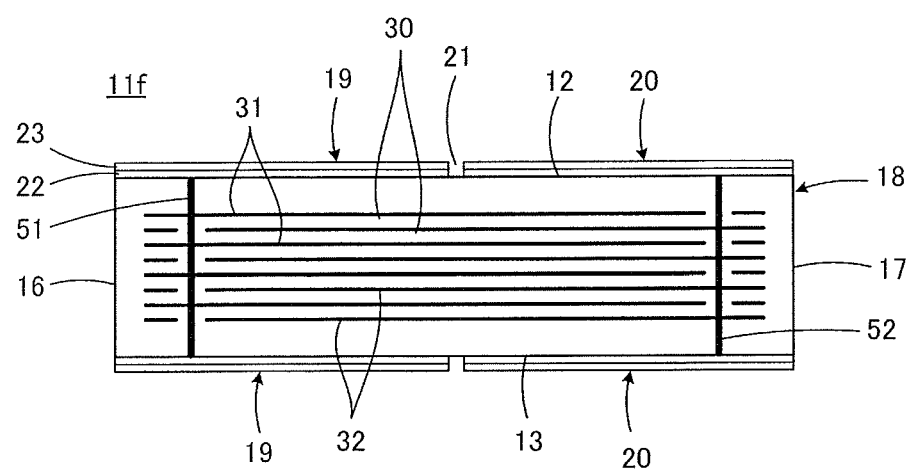
FIG. 13 is an LT cross-sectional view of a monolithic ceramic capacitor for illustrating a seventh embodiment of the invention.
Figure 14:
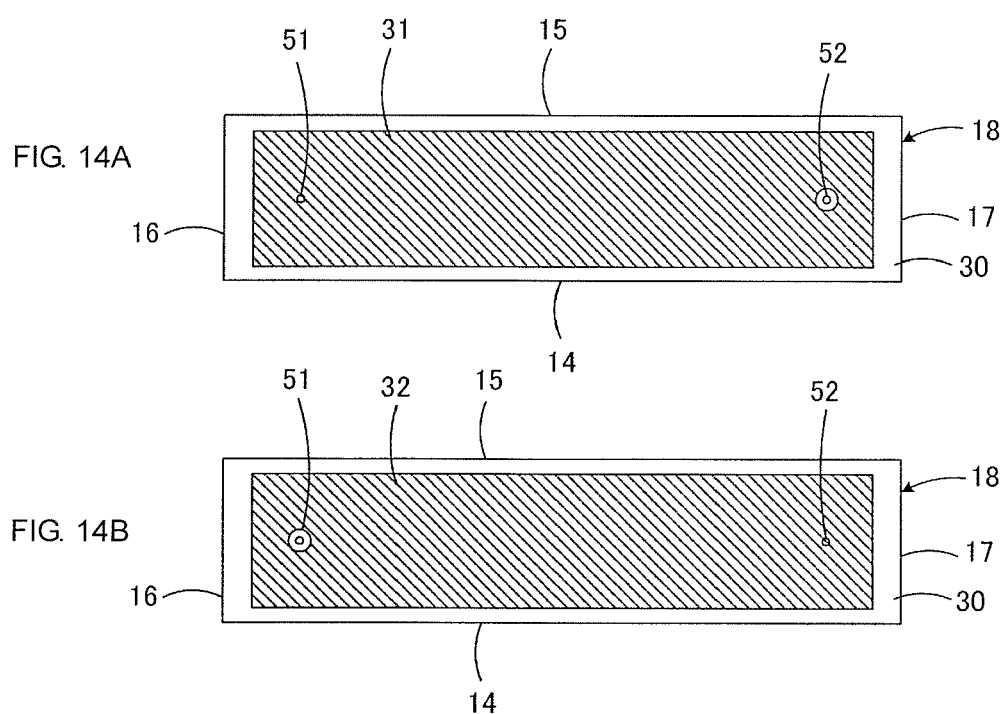

FIG. 13, FIG. 14A and FIG. 14B are views for illustrating a seventh embodiment of the invention, in which FIG. 13 is a LT cross-sectional view as well as FIG. 3A and FIG. 3B, and FIG. 14A and FIG. 14B are LW cross-sectional views. In addition, FIG. 14A and FIG. 14B show different cross sections from each other. In FIG. 13, FIG. 14A and FIG. 14B, like reference numerals denote components corresponding to the components shown in FIG. 3A, FIG. 3B, and the like, and the overlapping description is omitted.

In a monolithic ceramic capacitor 11f shown in FIG. 13, FIG. 14A and FIG. 14B, the dielectric layers 30 and the first and second internal electrodes 31 and 32 extend parallel to the first principal surface 12, that is, to a mounting surface, the first external terminal electrode 19 is electrically connected to the first internal electrodes 31 via a first via conductor 51, and then the second external terminal electrode 20 is electrically connected to the second internal electrodes 32 via a second via conductor 52.

In this type of monolithic ceramic capacitor 11f as well, the embodiments of the invention can effectively function.

The embodiments of the invention are described in relation to the monolithic ceramic capacitor; the embodiments of the invention may also be applied to a ceramic electronic component other than the monolithic ceramic capacitor.

Figure 15:
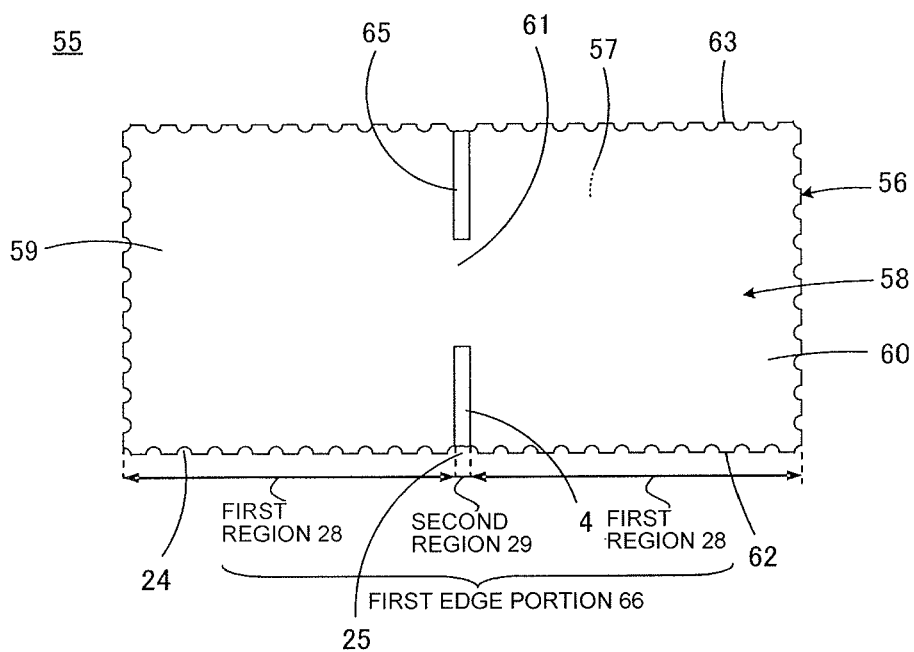
FIG. 15 is a view, corresponding to FIG. 1, for illustrating an eighth embodiment of the invention.

FIG. 15 is a view, corresponding to FIG. 1, for illustrating an eighth embodiment of the invention. In FIG. 15, like reference numerals denote components corresponding to the components shown in FIG. 1, and the overlapping description is omitted.

A ceramic electronic component 55 shown in FIG. 15 is not limited to the one that constitutes a monolithic ceramic capacitor. The ceramic electronic component 55 includes a ceramic element assembly 56 that corresponds to the above described capacitor body 18. An external conductor 58 formed on a first principal surface 57 of the ceramic element assembly 56 includes first and second conductive portions 59 and 60 and a connecting portion 61 that connects these first and second conductive portions 59 and 60. The connecting portion 61 has a relatively narrow width, and, as a result, first and second cutout portions 64 and 65 are respectively formed at a first side surface 62 side and a second side surface 63 side opposite to the first side surface 62 in the first principal surface 57.

In this embodiment as well, at least two first regions 28 and at least one second region 29 are formed at a first edge portion 66 of the first principal surface 57, which contacts the first side surface 62. An edge of the external conductor 58 is located in the at least two first regions 28. The at least one second region 29 is located between the adjacent two first regions 28, and an edge of the external conductor 58 is not located in the at least one second region 29. The extending recessed groove 25 is located so as to extend over the first regions 28 and the second region 29, and the other recessed grooves 24 are located in the first regions 28.

Hereinafter, an experimental example carried out to examine the advantageous effects of the embodiments of the invention will be described.

On the basis of the above described manufacturing process, monolithic ceramic capacitors, which are samples according to an example and a comparative example, were prepared. The design of the monolithic ceramic capacitors, which serve as samples according to the example and comparative example, are as shown in the following Table 1.

TABLE 1

| DIELECTRIC CERAMIC MATERIAL | CERAMICS CONTAINING BaTiO$_3$ AS MAIN COMPONENT |
|---|---|
| THICKNESS OF DIELECTRIC LAYER | 2 μm |
| MATERIAL OF INTERNAL ELECTRODE | Ni |
| THICKNESS OF INTERNAL ELECTRODE | 1 μm |
| MATERIAL OF BASE LAYER OF EXTERNAL TERMINAL ELECTRODE | Ni |
| THICKNESS OF BASE LAYER OF EXTERNAL TERMINAL ELECTRODE | 5 μm |
| MATERIAL OF PLATING FILM OF EXTERNAL TERMINAL ELECTRODE | Cu |
| THICKNESS OF PLATING FILM OF EXTERNAL TERMINAL ELECTRODE | 5 μm |

Figure 16:
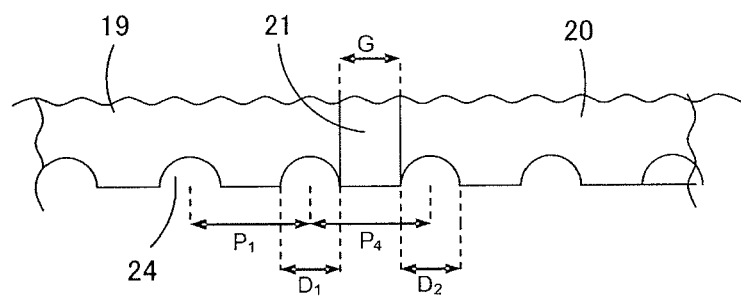
FIG. 16 is a view, corresponding to FIG. 5, showing a monolithic ceramic capacitor according to a comparative example, which is prepared in an experimental example.
Figure 17:
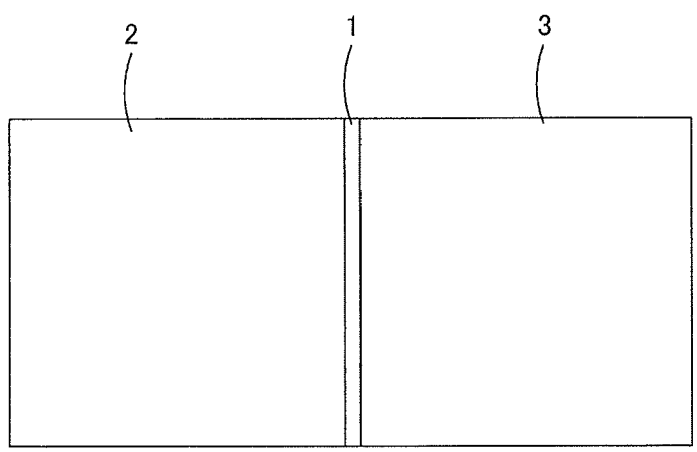
FIG. 17 is a plan view that shows an existing ceramic electronic component that is designed to increase areas of external terminal electrodes and as much as possible.

To obtain the above described monolithic ceramic capacitor, a collective component according to each of the example and a comparative example was prepared. The monolithic ceramic capacitor obtained from the collective component according to the example has a structure as shown in FIG. 5, and satisfies the condition of having at least one extending recessed groove located so as to extend over the first regions and the second region. On the other hand, the monolithic ceramic capacitor obtained from the collective component according to the comparative example has a structure as shown in FIG. 16, and does not satisfy the condition of having a recessed groove located so as to extend over the first regions and the second region.

In firing for obtaining these collective components, the following firing condition was applied. That is, the top temperature was set at 1200° C. while being maintained in a firing furnace for 25 hours, and the firing atmosphere was set to a reducing atmosphere. Thirty-six monolithic ceramic capacitors could be obtained from each collective component.

When the sizes of various portions, such as recessed grooves, formed in each monolithic ceramic capacitor that is obtained by breaking the above collective component are shown in measurements of various portions shown in FIG. 5 in the example and measurements of various portions shown in FIG. 16 in the comparative example, the sizes were set as shown in the following Table 2.

TABLE 2

|  | EXAMPLE (FIG. 5) | COMPARATIVE EXAMPLE (FIG. 16) |
| --- | --- | --- |
| $D_1$ | 100 | 100 |
| $D_2$ | 200 | 100 |
| $P_1$ | 170 | 170 |
| $P_2$ | 50 | — |
| $P_3$ | 170 | — |
| $P_4$ | — | 170 |
| G | 150 | 150 |

(UNIT: μm)

The appearances of the obtained monolithic ceramic capacitors according to the example and the comparative example were checked by microscope. As a result, there was no monolithic ceramic capacitor in which a break defect occurs among the obtained monolithic ceramic capacitors in the example. On the other hand, a break defect was identified in three monolithic ceramic capacitor among the obtained 36 monolithic ceramic capacitors in the comparative example.

While preferred embodiments of the invention have been described above, it is to be understood that variations and modifications will be apparent to those skilled in the art without departing from the scope and spirit of the invention. The scope of the invention, therefore, is to be determined solely by the claims.

What is claimed is:

1. A collective component from which a plurality of ceramic electronic components may be obtained by dividing the collective component along a predetermined break line, comprising:

mutually opposite first and second principal surfaces; and an external conductor on the first principal surface, wherein a plurality of break leading holes extend in a direction to connect the first and second principal surfaces, each of the break leading holes has an open end located on the first principal surface, the plurality of break leading holes are distributed along a break line, the collective component, when viewed from a side of the first principal surface, has a first region that intersects the external conductor in the break line and a second region that does not intersect the external conductor in the break line, the plurality of break leading holes include an extending break leading hole disposed so as to extend over the first region and the second region, and a pitch of adjacent break leading holes of the plurality of break leading holes is greater than a pitch of adjacent break leading holes of the extending break leading hole.

2. The collective component according to claim 1, wherein the adjacent break leading holes partially overlap each other in the second region.

3. The collective component according to claim 1, wherein the adjacent break leading holes are independent of each other in the second region.

4. The collective component according to claim 1, wherein the external conductor comprises a first external conductor having an edge located in one of the at least two first regions and a second external conductor having an edge located in the other one of the at least two first regions, and wherein the first external conductor and the second external conductor on the first principal surface are independent of each other.

5. The collective component according to claim 4, wherein the ceramic electronic component constitutes a monolithic ceramic capacitor that includes a plurality of laminated dielectric layers and first and second internal electrodes that face each other across a dielectric layer, wherein the first external conductor is electrically connected to the first internal electrode, and wherein the second external conductor is electrically connected to the second internal electrode.

6. The collective component according to claim 5, wherein the dielectric layers and the first and second internal electrodes extend vertically with respect to the first principal surface.

7. The collective component according to claim 5, wherein the dielectric layers and the first and second internal electrodes extend parallel to the first principal surface, wherein the first external conductor is electrically connected to the first internal electrode by a first via conductor, and wherein the second external conductor is electrically connected to the second internal electrode by a second via conductor.

8. The collective component according to claim 1, wherein each of the break leading holes has an open end located on the second principal surface.

9. A collective component from which a plurality of ceramic electronic components may be obtained by dividing the collective component along a predetermined break line, comprising:

mutually opposite first and second principal surfaces; and an external conductor on the first principal surface, wherein a plurality of break leading holes extend in a direction to connect the first and second principal surfaces, each of the break leading holes has an open end located on the first principal surface, the plurality of break leading holes are distributed along a break line, the collective component, when viewed from a side of the first principal surface, has a first region that intersects the external conductor in the break line and a second region that does not intersect the external conductor in the break line, the plurality of break leading holes include an extending break leading hole disposed so as to extend over the first region and the second region, and each of the break leading holes does not have an open end located on the second principal surface.

10. A collective component from which a plurality of ceramic electronic components may be obtained by dividing the collective component along a predetermined break line, comprising:

mutually opposite first and second principal surfaces; and an external conductor on the first principal surface, wherein a plurality of break leading holes extend in a direction to connect the first and second principal surfaces, each of the break leading holes has an open end located on the first principal surface, the plurality of break leading holes are distributed along a break line, the collective component, when viewed from a side of the first principal surface, has a first region that intersects the external conductor in the break line and a second region that does not intersect the external conductor in the break line, the plurality of break leading holes include an extending break leading hole disposed so as to extend over the first region and the second region, and the pitch between the extending break leading hole and the break leading hole adjacent to the extending break leading hole is smaller than the pitch between the plurality of break leading holes.

11. The collective component according to claim 1, wherein the plurality of break leading holes are arranged at a constant pitch.

12. The collective component according to claim 1, having an external conductor on the second principal surface.

13. The collective component according to claim 1, wherein a second edge portion of the first principal surface which contacts the second side surface facing the first side surface has a similar configuration to the first edge portion.

14. The collective component according to claim 1, wherein a surface of the external conductor is Cu.

15. A collective component from which a plurality of ceramic electronic components may be obtained by dividing the collective component along a predetermined break line, comprising:

mutually opposite first and second principal surfaces; and an external conductor on the first principal surface, wherein a plurality of break leading holes extend in a direction to connect the first and second principal surfaces, each of the break leading holes has an open end located on the first principal surface, the plurality of break leading holes are distributed along a break line, the collective component, when viewed from a side of the first principal surface, has a first region that intersects the external conductor in the break line and a second region that does not intersect the external conductor in the break line, the plurality of break leading holes include an extending break leading hole disposed so as to extend over the first region and the second region, a surface of the external conductor is Cu, and the extending break leading hole comprises interconnected break leading holes, a first of which is disposed so as to extend over the first region and a second of which is disposed so as to extend over the second region, wherein the pitch $P_2$ between the first and second interconnected break leading holes is smaller than the pitch $P_1$ between adjacent recessed break leading holes.

16. The collective component according to claim 15, wherein the pitch $P_3$ between the recessed break leading hole and the adjacent break leading hole extending over a first or second region is less than or equal to $P_1$.

17. The collective component according to claim 16, wherein $P_1$ is about 150 to 250 μm, $P_2$ is about 40 to 60 μm, pitch $P_3$ is about 150 to 250 μm, the length of each recessed break leading hole is about 80 to 120 μm, and the length of the extending recessed break leading hole is about 160 to 240 μm.

18. The collective component according to claim 17, wherein the ceramic electronic component is a monolithic ceramic capacitor that includes a plurality of laminated dielectric layers and first and second internal electrodes that face each other across a dielectric layer, the external conductor comprises a first external conductor having an edge located in one of the at least two first regions and a second external conductor having an edge located in the other one of the at least two first regions, the first external conductor is electrically connected to the first internal electrode, and the second external conductor is electrically connected to the second internal electrode, wherein the distance between the first and second principle surfaces is about 0.3 to 1.5 mm, the thickness of each internal electrode and dielectric layer is about 1 to 10 μm, and wherein the first and second external conductors comprise an about 5 to 40 μm thick electrically conductive base layer having at least one about 1 to 10 μm thick electrically conductive plating layer thereon.

19. A method of manufacturing a ceramic electronic component, comprising:

preparing a collective component that has mutually opposite first and second principal surfaces, an external conductor on the first principal surface, a plurality of break leading holes extending in a direction to connect the first and second principal surfaces, each of the break leading holes having an open end located at least on the first principal surface, and the plurality of break leading holes are arranged so as to be distributed along a predetermined break line; and obtaining a plurality of ceramic electronic components by dividing the collective component along the break line, wherein the collective component, when viewed from a side of the first principal surface, has a first region that intersects with the external conductor in the break line and a second region that does not intersect with the external conductor in the break line, and wherein the plurality of break leading holes includes at least one extending break leading hole disposed so as to extend over the first region and the second region, and a pitch of adjacent break leading holes of the plurality of break leading holes is greater than a pitch of adjacent break leading holes of the extending break leading hole.

20. The method according to claim 19, wherein the external conductor of the collective component comprises a first external conductor having an edge located in one of at least two first regions and a second external conductor having an edge located in another one of the at least two first regions; and wherein the ceramic electronic component constitutes a monolithic ceramic capacitor that includes a plurality of laminated dielectric layers and first and second internal electrodes that face each other across a dielectric layer, wherein the first external conductor is electrically connected to the first internal electrode, and wherein the second external conductor is electrically connected to the second internal electrode; and wherein the dielectric layers and the first and second internal electrodes extend parallel to the first principal surface, wherein the first external conductor is electrically connected to the first internal electrode by a first via conductor, and wherein the second external conductor is electrically connected to the second internal electrode by a second via conductor.

* * * * *